(12) United States Patent
Yang

(10) Patent No.: US 11,706,654 B2
(45) Date of Patent: *Jul. 18, 2023

(54) METHOD OF PROCESSING MEASUREMENT INFORMATION, TERMINAL AND ACCESS NETWORK NODE

(71) Applicant: VIVO MOBILE COMMUNICATION CO., LTD., Chang'an Dongguan (CN)

(72) Inventor: Xiaodong Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 1 day.

This patent is subject to a terminal disclaimer.

(21) Appl. No.: 17/490,222

(22) Filed: Sep. 30, 2021

(65) Prior Publication Data

US 2022/0022083 A1 Jan. 20, 2022

Related U.S. Application Data

(63) Continuation of application No. 16/609,103, filed as application No. PCT/CN2018/084666 on Apr. 26, 2018, now Pat. No. 11,206,564.

(30) Foreign Application Priority Data

Apr. 28, 2017 (CN) .......................... 201710296921.0

(51) Int. Cl.
*H04W 4/00* (2018.01)
*H04W 24/10* (2009.01)
(Continued)

(52) U.S. Cl.
CPC .......... *H04W 24/10* (2013.01); *H04W 24/02* (2013.01); *H04W 36/08* (2013.01); *H04W 36/30* (2013.01); *H04W 88/06* (2013.01)

(58) Field of Classification Search
CPC ..... H04W 24/10; H04W 24/02; H04W 36/08; H04W 36/30; H04W 88/06; H04W 76/16; H04W 36/0069
(Continued)

(56) References Cited

U.S. PATENT DOCUMENTS

| 7,957,721 | B2 * | 6/2011 | Hogan | ................... H04W 48/16 455/411 |
| 8,411,555 | B2 * | 4/2013 | Kazmi | ................... H04W 36/30 370/252 |

(Continued)

FOREIGN PATENT DOCUMENTS

| CN | 101316426 A | 12/2008 |
| CN | 102123459 A | 7/2011 |

(Continued)

OTHER PUBLICATIONS

International Search Report & Written Opinion related to Application No. PCT/CN2018/084666; reported on Nov. 7, 2019.
(Continued)

*Primary Examiner* — Amancio Gonzalez
(74) *Attorney, Agent, or Firm* — von Briesen & Roper, s.c.

(57) ABSTRACT

A method of processing measurement information, a terminal, and an access network node are provided. The method is applied to a multi-connection system. The method includes: acquiring, by the terminal, measurement information on at least one frequency other than a serving frequency of a second access network node; and transmitting, by the terminal, the measurement information on the at least one frequency other than the serving frequency of the second access network node to the second access network node, where the at least one frequency other than the serving
(Continued)

Receiving, by a second access network node, measurement information on at least one frequency other than a serving frequency of the second access network node sent by a terminal ⟶ S301

Performing, by the second access network node, an inter-system processing of a multi-connection system according to the measurement information on the at least one frequency other than the serving frequency of the second access network node ⟶ S302 frequency of the second access network node includes a serving frequency of a first access network node.

18 Claims, 9 Drawing Sheets

(51) Int. Cl.
    *H04W 24/02*     (2009.01)
    *H04W 36/08*     (2009.01)
    *H04W 36/30*     (2009.01)
    *H04W 88/06*     (2009.01)

(58) Field of Classification Search
    USPC .......................................................... 370/329
    See application file for complete search history.

(56) References Cited

U.S. PATENT DOCUMENTS

| | | | |
|---|---|---|---|
| 10,200,953 B2 | 2/2019 | Fujishiro | |
| 10,349,258 B2 | 7/2019 | Ramachandra et al. | |
| 10,368,383 B2* | 7/2019 | Jang | H04W 76/16 |
| 10,517,009 B2 | 12/2019 | Zetterberg et al. | |
| 10,616,817 B2 | 4/2020 | Zeng et al. | |
| 10,674,521 B2* | 6/2020 | Hahn | H04W 72/0446 |
| 11,206,564 B2* | 12/2021 | Yang | H04W 36/0069 |
| 2010/0285806 A1 | 11/2010 | Iwamura | |
| 2012/0076018 A1 | 3/2012 | Singh et al. | |
| 2014/0247743 A1 | 9/2014 | Seo | |
| 2015/0334767 A1 | 11/2015 | Chien et al. | |
| 2015/0350944 A1 | 12/2015 | Chen et al. | |
| 2015/0365857 A1 | 12/2015 | Wei et al. | |
| 2016/0021592 A1 | 1/2016 | Vesely et al. | |
| 2016/0087877 A1 | 3/2016 | Ryu et al. | |
| 2016/0227524 A1* | 8/2016 | Choi | H04L 5/00 |
| 2016/0249259 A1 | 8/2016 | Park et al. | |
| 2016/0353512 A1 | 12/2016 | Lu et al. | |
| 2018/0077594 A1 | 3/2018 | He et al. | |
| 2018/0124673 A1* | 5/2018 | Tenny | H04L 5/0091 |
| 2018/0199225 A1 | 7/2018 | Kim et al. | |
| 2020/0092741 A1* | 3/2020 | Yang | H04W 36/08 |
| 2020/0236568 A1* | 7/2020 | Yang | H04W 24/08 |
| 2020/0280869 A1 | 9/2020 | Biswas et al. | |

FOREIGN PATENT DOCUMENTS

| | | |
|---|---|---|
| CN | 102860076 A | 1/2013 |
| CN | 104936163 A | 9/2015 |
| CN | 105191390 A | 12/2015 |
| CN | 105338512 A | 2/2016 |
| CN | 106162728 A | 11/2016 |
| CN | 106470442 A | 3/2017 |
| CN | 106535269 A | 3/2017 |
| CN | 106559825 A | 4/2017 |
| CN | 106572475 A | 4/2017 |
| CN | 106792869 A | 5/2017 |
| WO | 2016046756 A1 | 3/2016 |
| WO | 2017014507 A1 | 1/2017 |

OTHER PUBLICATIONS

Chinese Search Report related to Application No. 201710296921.0; reported on Apr. 15, 2019.
Extended European Search Report related to Application No. 18791743.0; reported on Jan. 22, 2020.
First Chinese Office Action for related Application No. 201710296921.0; reported on Jun. 26, 2019.
Second Chinese Office Action for related Application No. 201710296921.0; reported on Feb. 19, 2020.
Non-Final Office Action for related U.S. Appl. No. 16/609,103; reported on Dec. 31, 2020.
Final Office Action for related U.S. Appl. No. 16/609,103; reported on Apr. 9, 2021.

* cited by examiner

METHOD OF PROCESSING MEASUREMENT INFORMATION, TERMINAL AND ACCESS NETWORK NODE

CROSS-REFERENCE TO RELATED APPLICATION

The present application is a continuation application of U.S. patent application Ser. No. 16/609,103 filed on Oct. 28, 2019, which is a U.S. national phase application of a PCT Application No. PCT/CN2018/084666 filed on Apr. 26, 2018, which claims a priority of Chinese Patent Application No. 201710296921.0 filed in China on Apr. 28, 2017, disclosures of which are incorporated in their entireties by reference herein.

TECHNICAL FIELD

The present disclosure relates to communications technology, in particular to a method of processing measurement information, a terminal, and an access network node.

BACKGROUND

In a 5G communications system, a terminal may be connected to a plurality of access network nodes simultaneously. One of the plurality of access network nodes is a master node (MN), and the rest are secondary nodes (SN). After the terminal is connected to an access network node, the access network node may instruct the terminal to perform measurement. Specifically, the access network node delivers a measurement configuration to the terminal to instruct the terminal to measure a serving frequency. The terminal reports a measurement result to the access network node.

When the terminal is connected to the plurality of access network nodes, each of the access network nodes is connected to the terminal at a distinct frequency. Assuming that access network nodes connected to the terminal are a node A and a node B, the node A cannot configure a serving frequency corresponding to the node B as a measurement frequency, and the node A cannot acquire measurement information on the serving frequency corresponding to the node B. As a result, the node A cannot perform an operation based on the serving frequency corresponding to the node B.

SUMMARY

Embodiments of the present disclosure provide a method of processing measurement information, a terminal, and an access network node, to solve the problem in the related art that an access network node cannot acquire measurement information on a serving frequency of another access network node.

A first aspect of the embodiments of the present disclosure provides a method of processing measurement information, applied to a multi-connection system, where the multi-connection system includes at least two access network nodes in communication with a terminal, and the method includes: acquiring, by the terminal, measurement information on at least one frequency other than a serving frequency of a second access network node; and transmitting, by the terminal, the measurement information on the at least one frequency other than the serving frequency of the second access network node to the second access network node.

A second aspect of the embodiments of the present disclosure provides an information processing method, applied to a multi-connection system, where the multi-connection system includes at least two access network nodes in communication with a terminal, and the method includes: receiving, by a second access network node, measurement information on at least one frequency other than a serving frequency of the second access network node transmitted by the terminal; and performing, by the second access network node, inter-system processing of the multi-connection system according to the measurement information on the at least one frequency other than the serving frequency of the second access network node.

A third aspect of the embodiments of the present disclosure provides a terminal, where the terminal is a terminal in a multi-connection system, the multi-connection system includes at least two access network nodes in communication with the terminal, and the terminal includes: an acquisition module, configured to acquire measurement information on at least one frequency other than a serving frequency of a second access network node; and a transmission module, configured to transmit the measurement information on the at least one frequency other than the serving frequency of the second access network node to the second access network node.

A fourth aspect of the embodiments of the present disclosure provides an access network node, where the access network node is a second access network node, the second access network node is an access network node in a multi-connection system, and the second access network node includes: a reception module, configured to receive measurement information on at least one frequency other than a serving frequency of the second access network node transmitted by a terminal; and a processing module, configured to perform inter-system processing of the multi-connection system according to the measurement information on the at least one frequency other than the serving frequency of the second access network node.

A fifth aspect of the embodiments of the present disclosure provides a terminal, which includes a processor and a storage, where the storage is configured to store a program, and the processor calls the program stored in the storage, to implement the method provided in the first aspect of the embodiments of the present disclosure.

A sixth aspect of the embodiments of the present disclosure provides an access network node, which includes a processor and a storage, where the storage is configured to store a program, and the processor calls the program stored in the storage, to implement the method provided in the second aspect of the embodiments of the present disclosure.

A seventh aspect of the embodiments of the present disclosure provides a terminal, including at least one processing element (or chip) configured to implement the foregoing method in the first aspect.

An eighth aspect of the embodiments of the present disclosure provides an access network node, including at least one processing element (or chip) configured to implement the foregoing method in the second aspect.

A ninth aspect of the embodiments of the present disclosure provides a program, where the program is configured to be executed by a processor, to implement the foregoing method in the first aspect.

A tenth aspect of the embodiments of the present disclosure provides a program product, for example, a computer readable storage medium, including the program in the ninth aspect.

An eleventh aspect of the embodiments of the present disclosure provides a program, where the program is configured to be executed by a processor, to implement the foregoing method in the second aspect.

A twelfth aspect of the embodiments of the present disclosure provides a program product, for example, a computer readable storage medium, including the program in the eleventh aspect.

A thirteenth aspect of the embodiments of the present disclosure provides a computer readable storage medium, including instructions, where the instructions are configured to be executed by a computer, to implement the method of processing measurement information in the first aspect.

A fourteenth aspect of the embodiments of the present disclosure provides a computer readable storage medium, including instructions, where the instructions are configured to be executed by a computer, to implement the method of processing measurement information in the second aspect.

According to the method of processing measurement information, the terminal, and the access network node provided in the embodiments of the present disclosure, a terminal acquires measurement information on at least one frequency other than a serving frequency of a second access network node, and transmits the measurement information on the at least one frequency other than the serving frequency of the second access network node to the second access network node. After receiving the measurement information, the second access network node may perform, according to the measurement information on the at least one frequency other than the serving frequency of the second access network node, inter-system processing based on such measurement information, thereby solving the problem that the second access network node cannot obtain measurement information on a serving frequency of another access network node and as a result cannot perform a corresponding operation.

BRIEF DESCRIPTION OF THE DRAWINGS

To describe the technical solutions in the embodiments of the present disclosure or in the related art more clearly, the accompanying drawings required for describing the embodiments or the related art are briefly described hereinafter. Apparently, the drawings accompanying the following descriptions show only some of the embodiments of the present disclosure, and a person of ordinary skill in the art may still derive other drawings from these accompanying drawings without creative efforts.

DETAILED DESCRIPTION

To make the objectives, technical solutions, and advantages of embodiment of the present disclosure clearer, the technical solutions in the embodiments of the present disclosure are clearly and thoroughly described below with reference to the accompanying drawings of the embodiments of the present disclosure. It is apparent the described embodiments are merely a part rather than all of the embodiments of the present disclosure. All other embodiments obtained by a person of ordinary skill in the art based on the embodiments of the present disclosure without creative efforts shall fall within the scope of the present disclosure.

The terms "comprise" and "have" or any variation of such terms in the specification and claims of the present disclosure are intended to cover a non-exclusive inclusion. For example, a process, method, system, product or device that includes a series of steps or units not only includes those steps or units specified expressly, but also includes other steps or units that are not specified expressly or are inherent to the process, method, product or device.

Figure 1:
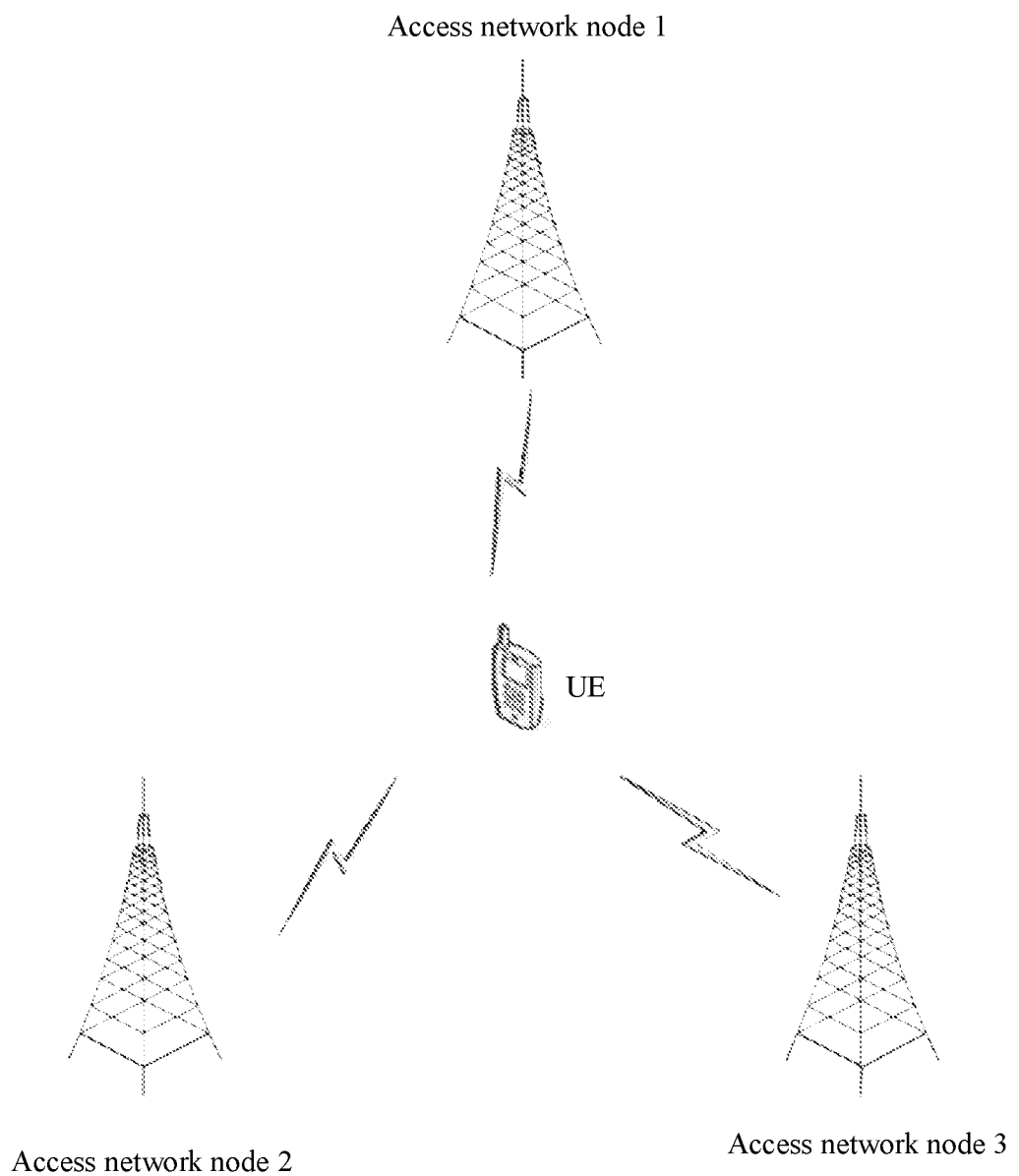
FIG. 1 is a schematic diagram of a system architecture for a method of processing measurement information provided by embodiments of the present disclosure.

FIG. 1 is a schematic diagram of a system architecture for a method of processing measurement information provided by embodiments of the present disclosure. As shown in FIG. 1, the system is a multi-connection system. In the multi-connection system, a terminal is connected to a plurality of access network nodes simultaneously. FIG. 1 shows a case in which a terminal is connected to three access network nodes simultaneously. However, the number of access network nodes that are specifically connected to the terminal may be any number greater than or equal to 2. Each of the access network nodes is connected to the terminal on a distinct frequency. For example, assuming that there are frequencies f1, f2, f3, f4, f5, and f6, an access network node 1 may be connected to the terminal on f1 and f2, an access network node 2 may be connected to the terminal on f3 and f4, and an access network node 3 may be connected to the terminal on f5 and f6. In addition, an access network node may further have a candidate frequency. The access network node is currently not connected to the terminal on the candidate frequency, but may be subsequently connected to the terminal on the candidate frequency.

It should be noted that, a serving frequency of an access network node as described in the embodiments of the present disclosure below is a frequency on which the access network node is connected with the terminal. For example, if the access network node 1 is connected to the terminal on f1 and f2, serving frequencies of the access network node 1 that correspond to the terminal are f1 and f2. If the access network node 2 is connected to the terminal on f3 and f4, serving frequencies of the access network node 2 that correspond to the terminal are f3 and f4.

In addition, in the system architecture related to the embodiments of the present disclosure, the access network nodes that are connected to the terminal simultaneously may be of the same radio access technology (RAT) or may be of different RATs. For example, in FIG. 1, the access network node 1 is an access network node in an LTE system, and the access network node 2 and the access network node 3 are access network nodes in a 5G system. Alternatively, the access network node 1, the access network node 2, and the access network node 3 are all access network nodes in a 5G system. Alternatively, the access network node 1 is an access network node in a Wideband Code Division Multiple Access (WCDMA) system, and the access network node 2 and the access network node 3 are access network nodes in a 5G system.

Some expressions related to the embodiments of the present disclosure are explained hereinafter, to help a person skilled in the art understand the embodiments of the present disclosure.

(1) Access Network Node

The access network node related to the embodiments of the present disclosure may be a device in an access network that communicates over an air interface with a wireless terminal via at least one sector. Optionally, a radio access network device may be configured to perform conversion between a received air frame and IP packet, and is used as a router between the wireless terminal and the rest of the access network. The rest of the access network may include an Internet Protocol (IP) network. Optionally, the access network node may further coordinate the management of attributes of the air interface. Optionally, the access network node may be a base transceiver station (BTS) of a Global System for Mobile Communications (GSM) or code division multiple access (CDMA), a NodeB (NB) of WCDMA, an evolved Node B (eNB or eNodeB) of LTE, a relay station or an access point, a gNB in a future 5G network or the like. This is not limited herein.

(2) Terminal

The terminal related to the embodiments of the present disclosure may be a wireless terminal or a wired terminal. The wireless terminal may be a device that provides a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) or a computer equipped with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile, a remote station, a remote terminal, an access terminal, a user terminal, a user agent or a user device or user equipment. This is not limited herein.

In the related art, in some scenarios, an access network node in a multi-connection system cannot configure frequencies corresponding to other access network nodes as measurement frequencies and as a result cannot obtain measurement results on these frequencies. A specific example is used below for description.

It is assumed that an access network node 1 shown in FIG. 1 is an access network node in an LTE system, and an access network node 2 is an access network node in a 5G system. The access network node 1 may be connected to the terminal on f1 and f2. The access network node 2 may be connected to the terminal on f3 and f4. The access network node 1 in LTE is not authorized by the access network node 2 in 5G to configure the frequencies f3 and f4 of the access network node 2 as measurement frequencies of the access network node 1. As a result, the access network node 1 cannot obtain measurement results of f3 and f4, which may lead to a failure of performing an operation based on f3 and f4 on the part of the access network node 1. For example, when the access network node 1 intends to perform an inter-RAT handover, a handover failure may result as the access network node 1 cannot acquire measurement results of f3 and f4.

The method of processing measurement information in the embodiments of the present disclosure is aimed at solving the foregoing technical problem in the related art.

Figure 2:
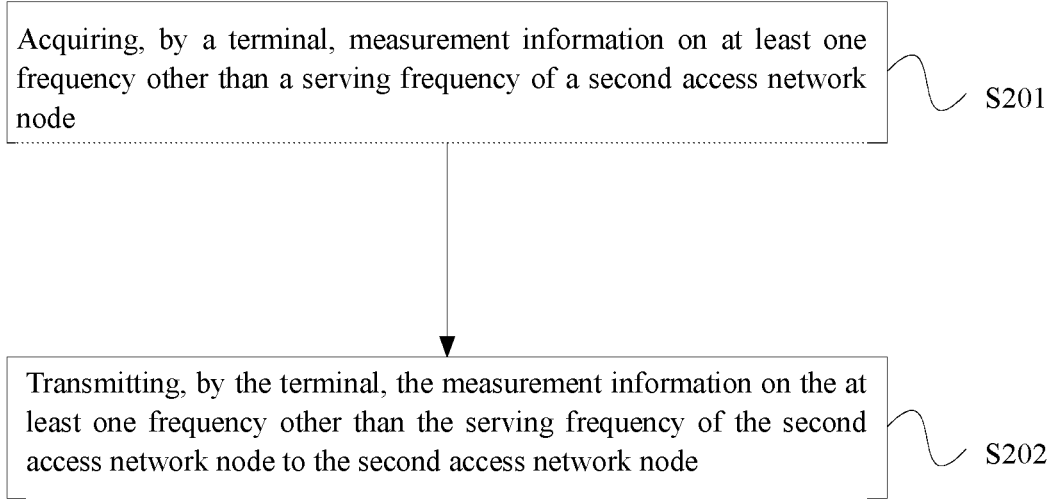
FIG. 2 is a schematic flow diagram of a method of processing measurement information provided by an embodiment of the present disclosure.

FIG. 2 is a schematic flow diagram of a method of processing measurement information provided by an embodiment of the present disclosure. The method is performed by a terminal in this embodiment. As shown in FIG. 2, the method includes the following steps.

S201: acquiring, by the terminal, measurement information on at least one frequency other than a serving frequency of a second access network node.

The at least one frequency other than the serving frequency of the second access network node includes a serving frequency of a first access network node, and may also include a candidate frequency of the second access network node and the like. The measurement on the at least one frequency other than the serving frequency of the second access network node is configured by the first access network node.

For ease of description, the at least one frequency other than the serving frequency of the second access network node is referred to as a target frequency hereinafter.

As described above, a serving frequency of an access network node is a frequency on which the access network node is connected with the terminal. From the perspective of the terminal, a frequency of a cell that serves the terminal is the serving frequency. Both a cell serving the terminal (referred to as a serving cell) and a neighboring cell are on the serving frequency. The measurement information on the serving frequency of the access network node may be measurement information of a serving cell, or may be measurement information of a neighboring cell, or may be measurement information of both a serving cell and a neighboring cell.

A specific manner of acquiring measurement information on the target frequency by the terminal is indicated by the first access network node in advance. Specifically, the first access network node may deliver a measurement configuration message to the terminal in advance. The measurement configuration message carries measurement configuration information. The terminal determines, according to the measurement configuration information indicated by the first access network node, when and how to perform measurement. The measurement configuration information may include a measurement object, an event parameter, a measurement interval, and so on. The measurement object is configured to indicate a frequency to be measured. The event parameter is configured to indicate an event that triggers measurement. The measurement interval is configured to indicate a time interval at which the terminal performs measurements. The first access network node may indicate one or more of these parameters. When more than one parameter is indicated, the terminal doesn't start measurement until all conditions corresponding to the indicated parameters are satisfied.

A specific manner of acquiring measurement information of the first access network node by the terminal may further be stipulated in advance. For example, the terminal may keep measuring a serving cell on the target frequency.

For example, it is assumed that the measurement configuration information delivered by the first access network node to the terminal includes a measurement object and an event parameter, where the measurement object is a frequency f1 and the event parameter is an event A1. The terminal measures the frequency f1 after the event A1 is triggered, and transmits a measurement result to the first access network node.

S202: transmitting, by the terminal, the measurement information on the at least one frequency other than the serving frequency of the second access network node to the second access network node.

Specifically, the second access network node is a node that needs to acquire measurement information on a serving frequency of another access network node in order to perform a corresponding operation. The terminal may actively or passively transmit measurement information on the target frequency to the second access network node. This is described in detail in the following embodiments.

It should be noted that, the terminal may transmit measurement information on one target frequency to the second access network node, or may transmit measurement information on a plurality of target frequencies to the second access network node. This is not limited in the embodiments of the present disclosure.

Further, after receiving the measurement information on the target frequency transmitted by the terminal, the second access network node may perform an inter-system processing based on the measurement information.

In this embodiment, a terminal acquires measurement information on at least one frequency other than a serving frequency of a second access network node, and transmits the measurement information on the at least one frequency other than the serving frequency of the second access network node to the second access network node, so that the second access network node may perform, according to the measurement information on the at least one frequency other than the serving frequency of the second access network node, an inter-system processing based on such measurement information, thereby solving the problem that the second access network node cannot obtain measurement information on a serving frequency of another access network node and as a result cannot perform a corresponding operation.

Figure 3:
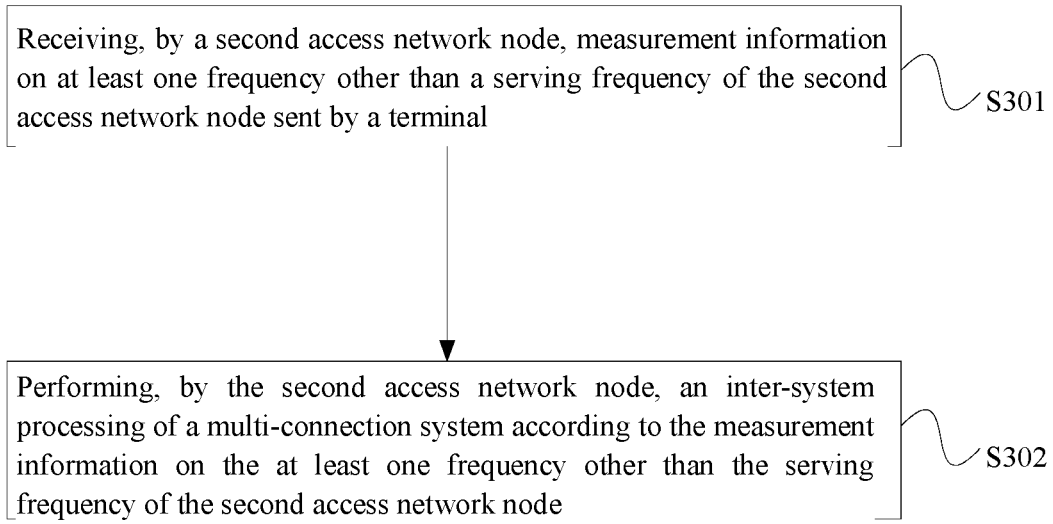
FIG. 3 is a schematic flow diagram of a method of processing measurement information provided by another embodiment of the present disclosure.

FIG. 3 is a schematic flow diagram of a method of processing measurement information provided by another embodiment of the present disclosure. Corresponding to FIG. 2, the method is performed by an access network node in this embodiment. As shown in FIG. 3, the method includes the following steps.

S301: receiving, by a second access network node, measurement information on at least one frequency other than a serving frequency of the second access network node transmitted by a terminal.

Optionally, the second access network node may indicate in advance to the terminal a manner of transmitting the measurement information, or the terminal may actively transmit measurement information on a target frequency to the second access network node. A specific process is described in detail in the following embodiments.

It should be noted that, the second access network node may receive measurement information on one target frequency transmitted by the terminal, or may receive measurement information on a plurality of target frequencies transmitted by the terminal. This is not limited in the embodiments of the present disclosure.

S302: performing, by the second access network node, an inter-system processing of a multi-connection system according to the measurement information on the at least one frequency other than the serving frequency of the second access network node.

For example, it is assumed that the second access network node is an LTE access network node, the first access network node is a 5G node, the second access network node is connected to the terminal on frequencies f1 and f2, the first access network node is connected to the terminal on frequencies f3 and f4, and the terminal transmits measurement information on the frequencies f3 and f4 of the first access network node to the second access network node. When the second access network node determines that the quality of a cell in which the terminal is currently located is lower than a preset threshold and as a result an inter-RAT handover is need, the second access network node may determine, according to the measurement information on f3 and f4 transmitted by the terminal, whether to handover the terminal to a cell corresponding to f3 or f4. In contrast, in the related art, the second access network node cannot acquire the measurement information on f3 and f4 and as a result cannot perform the inter-system processing.

In this embodiment, after acquiring measurement information on at least one frequency other than a serving frequency of a second access network node transmitted by a terminal, the second access network node may perform an inter-system processing, for example, inter-RAT handover, of a multi-connection system according to the measurement information, thereby solving the problem that the second access network node cannot obtain measurement information on a serving frequency of another access network node and as a result cannot perform a corresponding operation.

Specific methods of transmitting the measurement information on the target frequency to the second access network node by the terminal are described below in detail.

As described above, the terminal may actively or passively transmit information of the first access network node to the second access network node. Specifically, there may be the following four implementation modes.

(1) Transmitting by the Terminal Actively

In the implementation mode, the terminal actively transmits the measurement information on the target frequency to the second access network node without relying on a reporting configuration message with respect to the target frequency transmitted by the second access network node.

Optionally, the terminal may transmit the measurement information on the target frequency to the second access network node according to a preset period, or the terminal may transmit measurement information on a new serving frequency of the first access network node to the second access network node after acquiring the measurement information, or the terminal may transmit the acquired measurement information on the target frequency to the second access network node when the measurement information is greater than or less than a particular threshold.

However, it should be noted that, in this implementation mode, regardless of the manner of transmitting the measurement information on the target frequency to the second access network node by the terminal, the transmitting is an active behavior of the terminal and does not rely on a reporting configuration message with respect to the first access network node transmitted by the second access network node. However, optionally, the terminal may actively determine, based on a measurement configuration message with respect to the second access network node itself transmitted by the second access network node, a manner of transmitting the measurement information on the target frequency to the second access network node. For example, if the second access network node indicates to the terminal in advance that the measurement information on the serving frequency of the second access network node is to be transmitted at an interval of 10 seconds, the terminal may transmit the measurement information on the target frequency to the second access network node at an interval of 10 seconds or 20 seconds.

(2) Transmitting by the Terminal Based on a Reporting Configuration Message with Respect to the Target Frequency Transmitted by the Second Access Network Node In the implementation mode, the second access network node transmits the reporting configuration message with respect to the target frequency to the terminal. The message is configured to indicate a manner of transmitting measurement information on the target frequency by the terminal, for example, periodical transmitting or transmitting in an event-triggering mode, and the message may also instruct the terminal to transmit measurement information on a specific serving frequency of the first access network node.

It should be noted that, in the implementation mode, the second access network node needs to specifically transmit a reporting configuration message with respect to the target frequency (assumed as a first indication) to the terminal. The reporting configuration message is independent of a measurement configuration message with respect to the second access network node or another access network node (assumed as a second indication) transmitted by the second access network node. However, optionally, the first indication and the second indication may be transmitted to the terminal by using a same message.

(3) Transmitting by the Terminal Along with the Measurement Information on the Serving Frequency of the Second Access Network Node In the implementation mode, the terminal transmits the measurement information on the target frequency while transmitting the measurement information on the serving frequency of the second access network node to the second access network node. Specifically, when the terminal transmits the measurement information on the serving frequency of the second access network node to the second access network node, if the terminal has acquired the measurement information on the target frequency, the terminal transmits the measurement information on the target frequency together with the measurement information on the serving frequency of the second access network node to the second access network node.

A manner of transmitting the measurement information on the serving frequency of the second access network node to the second access network node by the terminal is indicated in a measurement configuration message transmitted by the second access network node to the terminal in advance. Therefore, it may be considered that, in the implementation mode, the terminal indicates a reporting mode of the measurement information on the target frequency by using the measurement configuration message with respect to the serving frequency of the second access network node.

(4) Transmitting by the Terminal when a Reporting Request Message of the Second Access Network Node is Received In the implementation mode, the second access network node dynamically instructs the terminal to report the measurement information on the target frequency. Specifically, when a second access network determines that the measurement information on the target frequency needs to be acquired, the second access network transmits a reporting request message to the terminal. After receiving the reporting request message, the terminal transmits the measurement information on the target frequency to the second access network node.

During a specific implementation process, the foregoing four implementation modes may be separately implemented or may be implemented in combination. For example, (2) and (4) are implemented in combination. That is, the second access network node may transmit the reporting configuration message with respect to the target frequency to the terminal in advance, and the terminal transmits the measurement information on the target frequency to the second access network node according to the reporting configuration message. In this process, if, at a certain time, the second access network node fails to receive the measurement information on the target frequency transmitted by the terminal but needs to use the measurement information, the second access network node may transmit the reporting request message to the terminal. After the terminal receives the reporting request message, the terminal transmits the measurement information on the target frequency to the second access network node, even if currently a condition indicated by the reporting configuration message is not satisfied.

A specific combination of the four implementation modes is not limited in the embodiments of the present disclosure and may be flexibly selected as required.

Specific processing processes of the second access network node and the terminal according to the latter three implementation modes of the four implementation modes are separately described below in detail.

Second Implementation Mode.

Figure 4:
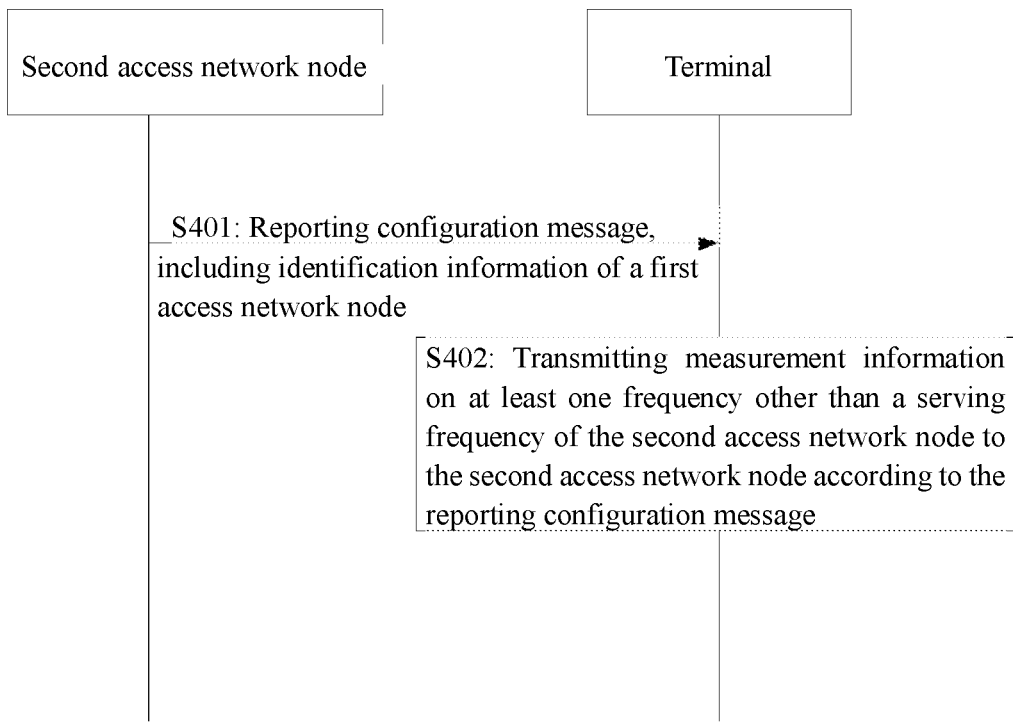
FIG. 4 is a flow diagram of the interaction between a second access network node and a terminal corresponding to a second implementation.

FIG. 4 is a flow diagram of the interaction between a second access network node and a terminal corresponding to a second implementation mode. As shown in FIG. 4, an interaction process includes the following steps.

S401: transmitting, by the second access network node, a reporting configuration message to the terminal. The reporting configuration message includes identification information of a first access network node.

The reporting configuration message is configured to indicate to the terminal reporting configuration information such as a reporting mode of measurement information on a target frequency, and a reporting frequency of measurement information on a target frequency.

Optionally, the identification information of the first access network node may include an identifier of the first access network node, an identifier of a serving frequency of the first access network node, an identifier of a serving cell of the first access network node, and a measurement identifier of the first access network node.

The measurement identifier of the first access network node may correspond to one measurement object and one piece of reporting configuration information.

As an optional implementation mode, the reporting configuration message may be specifically a measurement configuration message transmitted by the second access network node. The measurement configuration message is configured to configure a measurement process by the terminal on the serving frequency of the second access network node, and the measurement configuration message is further configured to configure a process of reporting the measurement information on the target frequency by the terminal.

For example, assuming that the second access network node is a node 1, the first access network node is a node 2, and there is additionally a third access network node 3 connected to the terminal, when the node 1 transmits a measurement configuration message on a serving frequency of the node 1 to the terminal, reporting configuration information with respect to a serving frequency of the node 2 may be carried along with the measurement configuration message. Similarly, when the node 1 transmits a measurement configuration message on a serving frequency of the node 3 to the terminal, the reporting configuration message with respect to the serving frequency of the node 2 may be carried along with the measurement configuration message.

In the foregoing optional implementation mode, the reporting configuration information may be transmitted to the terminal by being carried in the measurement configuration message. Such a process can reduce message interaction between the second access network node and the terminal, thereby saving network resources.

S402: transmitting, by the terminal, measurement information on at least one frequency other than a serving frequency of the second access network node to the second access network node according to the reporting configuration message.

After receiving the reporting configuration message, the terminal transmits the measurement information on the target frequency to the second access network node according to the reporting configuration message.

Optionally, the reporting configuration message may include a first frequency and/or reporting mode indication information, where the reporting mode information includes a reporting period indication information or a reporting trigger event indication information.

Specific descriptions are provided respectively hereinafter.

1. First Frequency

The first frequency is at least one frequency on which the terminal is connected to the first access network node.

If the reporting configuration message transmitted by the second access network node to the terminal includes the first frequency, it indicates that the second access network node only expects the terminal to report measurement information on the first frequency of the first access network node, rather than measurement information on all serving frequencies of the first access network node. The terminal transmits the measurement information on the first frequency of the first access network node to the second access network node according to the first frequency included in the reporting configuration message. Correspondingly, the second access network node receives the measurement information on the first frequency of the first access network node transmitted by the terminal.

For example, assuming that frequencies on which the first access network node is connected to the terminal are f3 and f4, and the reporting configuration message transmitted by the second access network node to the terminal includes f3 only, the terminal only needs to transmit measurement information on f3 to the second access network node without having to transmit measurement information on f4.

In the implementation mode, the second access network node indicates frequency information to the terminal, so that the terminal only transmits measurement information on a frequency required by the second access network node to the second access network node. The terminal may not transmit measurement information on other frequencies. In this way, the second access network node is prevented from receiving useless measurement information, thereby improving processing efficiency of the second access network node.

2. Reporting Mode Indication Information

In the implementation mode, the reporting configuration message transmitted by the second access network node to the terminal includes reporting mode indication information. After receiving the reporting mode indication information, the terminal transmits the measurement information on the target frequency to the second access network node according to a reporting mode indicated by the reporting mode indication information. Correspondingly, the second access network node receives the measurement information on the target frequency transmitted by the terminal according to the reporting mode indicated by the reporting mode indication information.

Specific processing processes of two types of reporting mode indication information are described below in detail.

Figure 5:
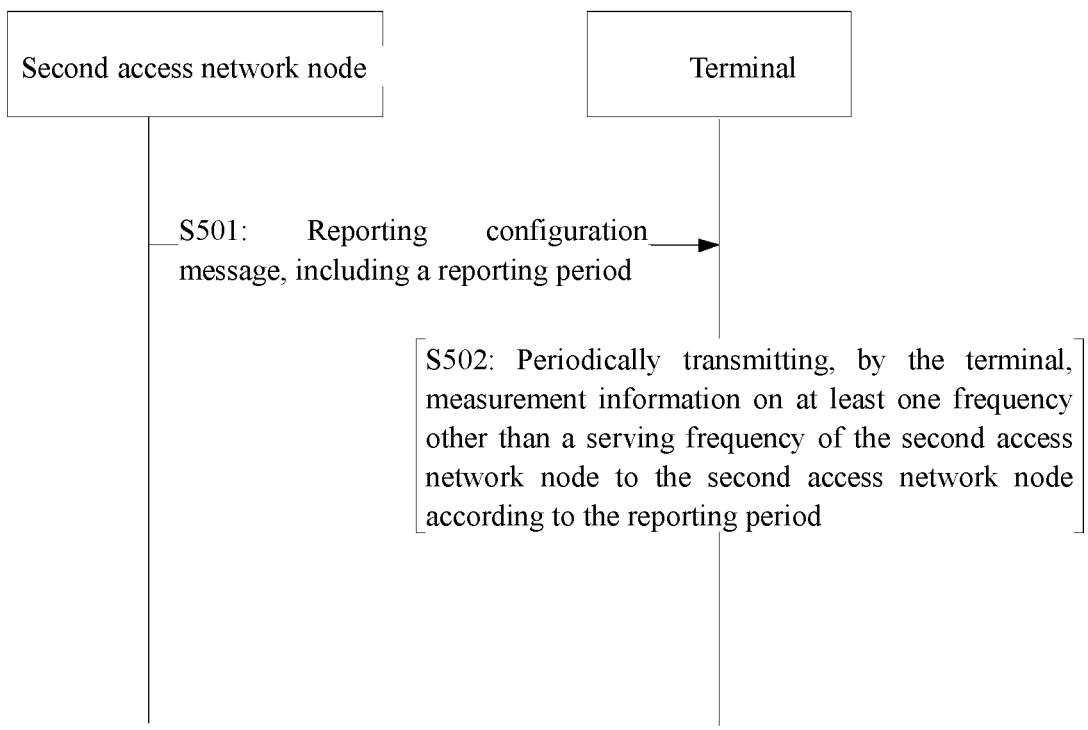
FIG. 5 is a flow diagram of the interaction between a second access network node and a terminal when reporting mode indication information is a reporting period in the second implementation.

FIG. 5 is a flow diagram of the interaction between a second access network node and a terminal when reporting mode indication information is a reporting period in the second implementation mode. As shown in FIG. 5, an interaction process includes the following steps.

S501: transmitting, by the second access network node, a reporting configuration message to the terminal. The reporting configuration message includes a reporting period.

S502: periodically transmitting, by the terminal, measurement information on at least one frequency other than a serving frequency of the second access network node to the second access network node according to the reporting period.

Correspondingly, the second access network node receives measurement information on a target frequency periodically reported by the terminal according to the reporting period.

Figure 6:
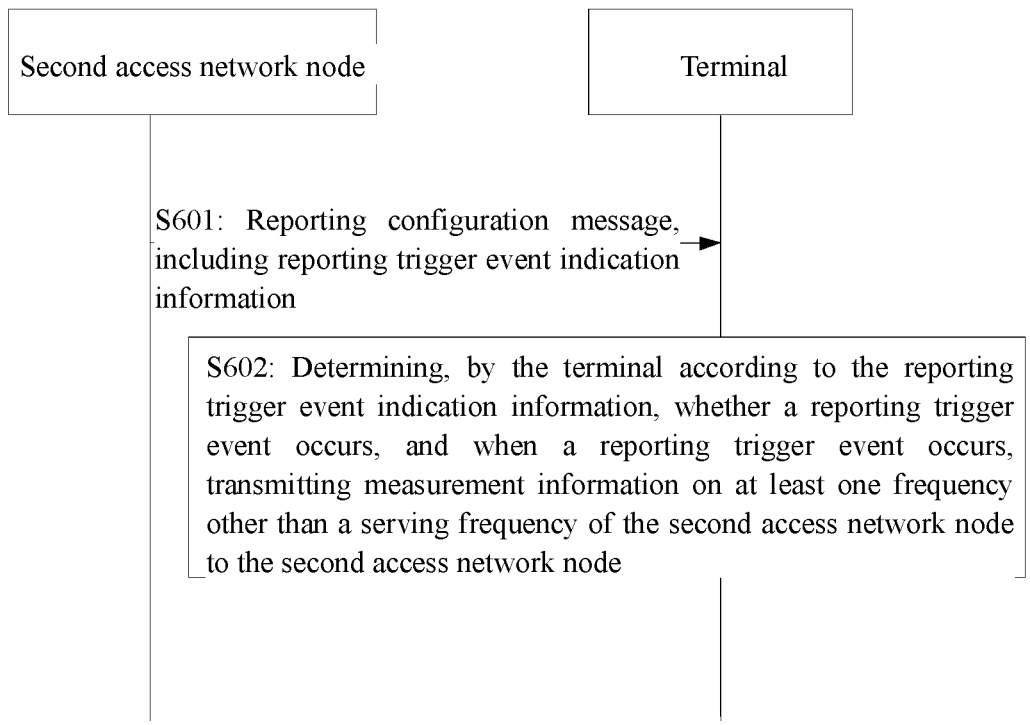
FIG. 6 is a flow diagram of the interaction between a second access network node and a terminal when reporting mode indication information is reporting trigger event indication information in the second implementation.

FIG. 6 is a flow diagram of the interaction between a second access network node and a terminal when reporting mode indication information is reporting trigger event indication information in the second implementation mode. As shown in FIG. 6, an interaction process includes the following steps.

S601: transmitting, by the second access network node, a reporting configuration message to the terminal. The reporting configuration message includes reporting trigger event indication information.

S602: determining, by the terminal according to the reporting trigger event indication information, whether a reporting trigger event occurs, and when a reporting trigger event occurs, transmitting, by the terminal, measurement information on at least one frequency other than a serving frequency of the second access network node to the second access network node.

Correspondingly, the second access network node receives measurement information on a target frequency reported by the terminal according to the reporting trigger event indication information.

Optionally, the reporting trigger event may include at least one of following events: an event A1, configured to identify that the signal quality of a serving cell is higher than a threshold; an event A2, configured to identify that the signal quality of a serving cell is lower than a threshold; an event A3, configured to identify that the signal quality of a neighboring cell is higher than the signal quality of a first serving cell by a particular value, where the first serving cell may be, for example, a primary cell (PCell) or a primary secondary cell (PScell) in a multi-connection system; an event A4, configured to identify that the signal quality of a neighboring cell is higher than a threshold; an event A5, configured to identify that the signal quality of a serving cell is lower than a threshold and the signal quality of a neighboring cell is higher than a threshold; an event A6, configured to identify that the signal quality of a neighboring cell is higher than the signal quality of a second serving cell by a particular value, where the second serving cell may be, for example, a secondary cell (SCell) in a multi-connection system; an event B1, configured to identify that the signal quality of an inter-RAT neighboring cell is higher than a threshold; an event B2, configured to identify that the signal quality of a serving cell is lower than a threshold and the signal quality of an inter-RAT neighboring cell is higher than a threshold.

It should be noted that the foregoing events may be used separately or may be used in combination. The second access network node may flexibly select a combination of events as required. One specific example is used for description below.

Assuming that the reporting trigger event indication information in the reporting configuration message transmitted by the second access network node to the terminal is the event A2 and the event A4, after receiving the reporting trigger event indication information, the terminal monitors whether the event A2 and the event A4 occur simultaneously, that is, monitors whether the signal quality of a serving cell of the terminal is lower than a threshold and whether the signal quality of a neighboring cell is higher than a threshold. If the two events occur simultaneously, the terminal transmits the measurement information on the target frequency to the second access network node.

Optionally, when the second access network node transmits the reporting configuration message, different information elements may be added to the message to carry reporting configuration information. For example, one information element "frequency" may be added to represent a first frequency. When the information element is invalid or 0, it represents that information about the first frequency is not carried. When the information element has a valid frequency value, the terminal may report measurement information according to the frequency value. For another example, one information element "period" may be added to represent a reporting period. When the information element is invalid or 0, it represents that reporting period information is not carried. When the information element is a valid value, the terminal may report measurement information according to the period value.

In this implementation mode, a second access network node transmits a reporting configuration message with respect to a first access network node to the terminal according to an actual requirement, so that the terminal reports measurement information on a target frequency based on the reporting configuration message specifically directed to the first access network node, thereby ensuring that the measurement information on the target frequency reported by the terminal completely satisfies requirements with respect to a measurement of the first access network node by the second access network node.

Third Implementation Mode.

Figure 7:
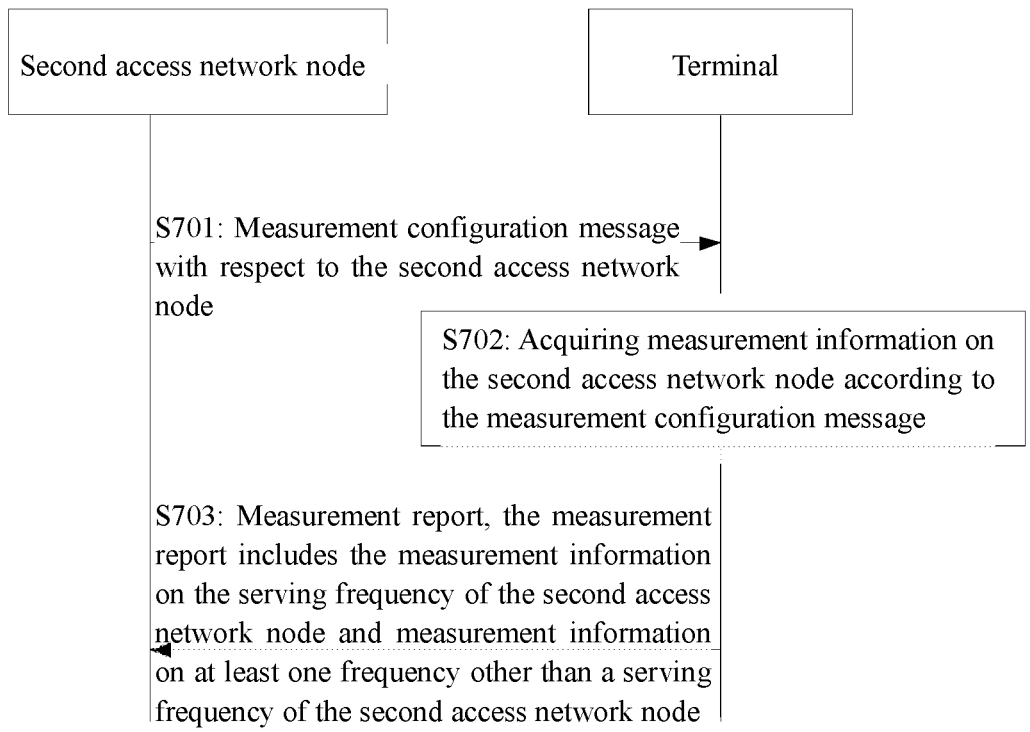
FIG. 7 is a flow diagram of the interaction between a second access network node and a terminal in a third implementation.

FIG. 7 is a flow diagram of the interaction between a second access network node and a terminal in a third implementation mode. As shown in FIG. 7, an interaction process includes the following steps.

S701: transmitting, by the second access network node, a measurement configuration message with respect to a serving frequency of the second access network node to the terminal.

Optionally, the measurement on the serving frequency of the second access network node may be measurement according to a frequency and/or periodic measurement or measurement according to an event-triggering mode. The second access network node may indicate a measurement mode in the measurement configuration message. For a specific implementation of each measurement mode, refer to a measurement mode in a reporting configuration message of the foregoing second implementation mode. A repeated description is omitted herein.

S702: acquiring, by the terminal, measurement information on the serving frequency of the second access network node according to the measurement configuration message.

S703: transmitting, by the terminal, a measurement report to the second access network node. The measurement report includes the measurement information on the serving frequency of the second access network node and measurement information on at least one frequency other than a serving frequency of the second access network node.

Specifically, when the terminal transmits the measurement information on the serving frequency of the second access network node to the second access network node, if the terminal has acquired measurement information on a target frequency, the measurement information on the target frequency is transmitted together with the measurement information on the serving frequency of the second access network node to the second access network node.

It should be noted that, as described above, both a serving cell and a neighboring cell are on the serving frequency. In this step, the measurement information on the serving frequency of the second access network node included in the measurement report may be measurement information on a serving cell of the second access network node, measurement information on a neighboring cell or measurement information on a serving cell and a neighboring cell. Similarly, the measurement information on the target frequency may be measurement information on a serving cell of a first access network node, measurement information on a neighboring cell or measurement information on a serving cell and a neighboring cell.

In this implementation mode, the terminal transmits measurement information on a target frequency while transmitting the measurement information on the serving frequency of the second access network node to the second access network node, so that the second access network node may combine the measurement information on the serving frequency of the second access network node and the measurement information on the target frequency to determine whether to perform an operation such as handover, so that processing efficiency of the second access network node can be further improved.

Fourth Implementation Mode.

Figure 8:
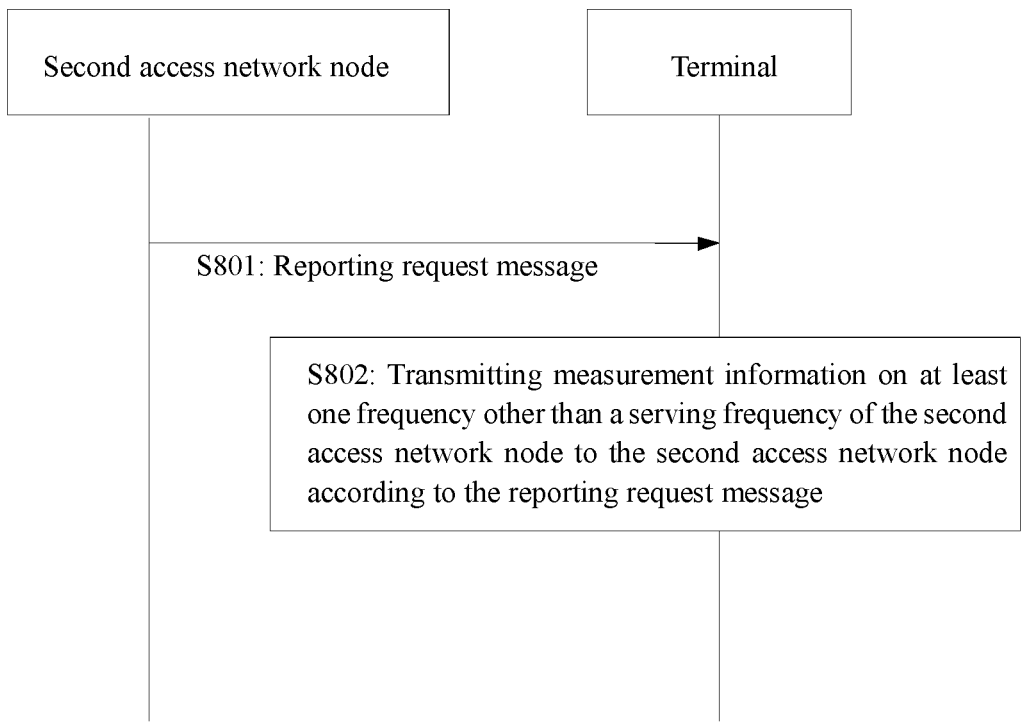
FIG. 8 is a flow diagram of the interaction between a second access network node and a terminal in a fourth implementation.

FIG. 8 is a flow diagram of the interaction between a second access network node and a terminal in a fourth implementation mode. As shown in FIG. 8, an interaction process includes the following steps.

S801: transmitting, by the second access network node, a reporting request message to the terminal. The reporting request message is configured to request the terminal to report measurement information on at least one frequency other than a serving frequency of the second access network node.

S802: transmitting, by the terminal, the measurement information on the at least one frequency other than the serving frequency of the second access network node to the second access network node according to the reporting request message.

Optionally, the second access network node may carry a first frequency in the reporting request message. That is, the second access network node instructs the terminal to report measurement information on the first frequency of a first access network node to the second access network node. After receiving the reporting request message carrying the first frequency, the terminal transmits the measurement information on the first frequency of the first access network node to the second access network node.

In this implementation mode, the second access network node may transmit the reporting request message to the terminal when the measurement information on the at least one frequency other than the serving frequency of the second access network node is needed. The terminal transmits the measurement information on the at least one frequency other than the serving frequency of the second access network node to the second access network node according to the reporting request message, so that the second access network node may acquire the measurement information on the at least one frequency other than the serving frequency of the second access network node at any time if necessary.

A scenario in which the first access network node is an access network node in a 5G system and the second access network node is an access network node in an LTE system is used as an example below, to describe a specific implementation process of the method of processing measurement information in the embodiments of the present disclosure in this scenario.

To facilitate understanding, the first access network node is referred to as a 5G access network node and the second access network node is referred to as an LTE access network node hereinafter.

Figure 9:
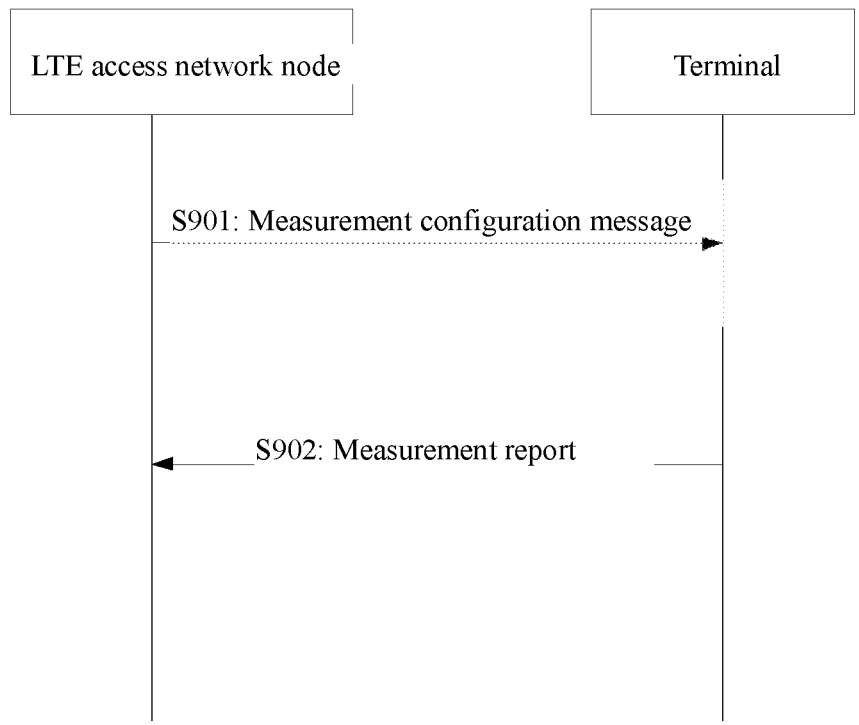
FIG. 9 is a flow diagram of a process of processing measurement information by a Long Term Evolution (LTE) access network node.

FIG. 9 is a flow diagram of a process of processing measurement information by an LTE access network node. As shown in FIG. 9, a processing process includes the following steps.

S901: transmitting, by the LTE access network node, a measurement configuration message to a terminal.

The measurement configuration message includes measurement configuration information of a serving frequency of the LTE access network node, and further includes reporting configuration information with respect to a serving frequency of a 5G access network node configured by the LTE access network node. Specifically, one or more new fields may be added to the measurement configuration message to transfer the reporting configuration information with respect to the serving frequency of the 5G access network node configured by the LTE access network node.

It should be noted that, this is only an optional implementation mode. Alternatively, the reporting configuration information with respect to the serving frequency of the 5G access network node configured by the LTE access network node may be transmitted to the terminal by using a separate reporting configuration message.

S902: transmitting, by the terminal, a measurement report to the LTE access network node.

After the terminal receives the measurement configuration message transmitted by the LTE access network node, on one hand, a serving frequency of the LTE access network node needs to be measured to acquire a measurement result (assuming it is referred to as LTE measurement information) and the terminal needs to report the LTE measurement information to the LTE access network node; on the other hand, the terminal needs to report measurement information of the 5G access network node (assuming it is referred to as 5G measurement information) to the LTE access network node.

Specifically, the terminal may report both the LTE measurement information and the 5G measurement information to the LTE access network node in a same measurement report, or may report the LTE measurement information and the 5G measurement information separately to the LTE access network node.

Figure 10:
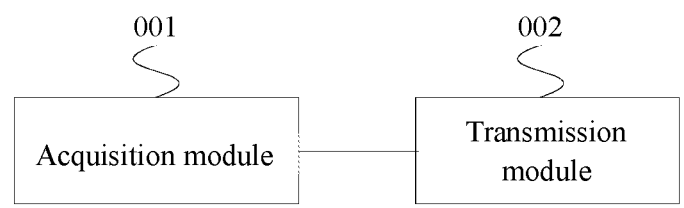
FIG. 10 is a schematic structural diagram of a terminal provided by an embodiment of the present disclosure.

FIG. 10 is a schematic structural diagram of a terminal provided by an embodiment of the present disclosure. The terminal is a terminal in a multi-connection system. The multi-connection system includes at least two access network nodes in communication with the terminal. As shown in FIG. 10, the terminal includes an acquisition module 001 and a transmission module 002.

The acquisition module 001 is configured to acquire measurement information on at least one frequency other than a serving frequency of a second access network node.

The transmission module 002 is configured to transmit the measurement information on the at least one frequency other than the serving frequency of the second access network node to the second access network node.

In this embodiment, the acquisition module acquires measurement information on at least one frequency other than a serving frequency of a second access network node, and the transmission module transmits the measurement information on the at least one frequency other than the serving frequency of the second access network node to the second access network node, so that the second access network node may perform, according to the measurement information on the at least one frequency other than the serving frequency of the second access network node, intersystem processing based on such measurement information, thereby solving the problem that the second access network node cannot obtain measurement information on a serving frequency of another access network node and as a result cannot perform a corresponding operation.

Figure 11:
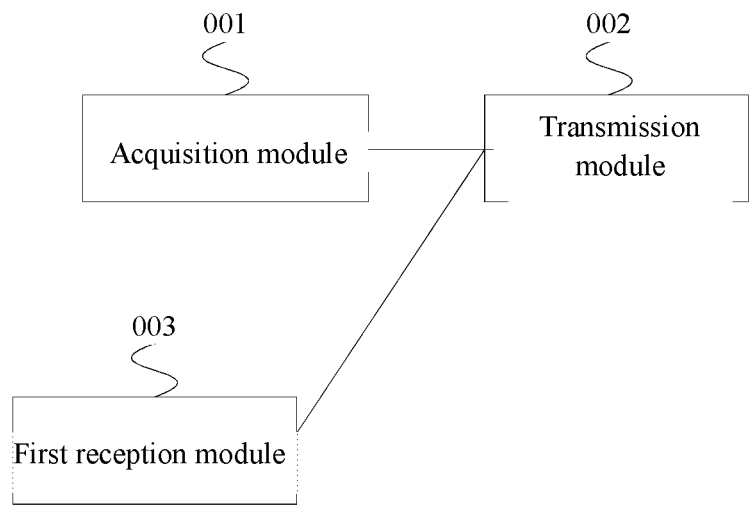
FIG. 11 is a schematic structural diagram of a terminal provided by another embodiment of the present disclosure.

FIG. 11 is a schematic structural diagram of a terminal provided by another embodiment of the present disclosure. As shown in FIG. 11, the terminal further includes a first reception module 003.

The first reception module 003 is configured to receive a reporting configuration message transmitted by a second access network node. The reporting configuration message includes identification information of a first access network node.

Correspondingly, the transmission module 002 is specifically configured to transmit the measurement information on at least one frequency other than a serving frequency of the second access network node to the second access network node according to the reporting configuration message.

Optionally, the identification information of the first access network node includes an identifier of the first access network node, an identifier of a frequency on which the first access network node operates or an identifier of a cell in which the first access network node operates.

Further, the reporting configuration message includes a first frequency; and correspondingly, the transmission module 002 is further specifically configured to transmit measurement information on the first frequency of the first access network node to the second access network node.

Further, the reporting configuration message includes a reporting period; and correspondingly, the transmission module 002 is further specifically configured to periodically transmit the measurement information on the at least one frequency other than the serving frequency of the second access network node to the second access network node according to the reporting period.

Further, the reporting configuration message includes reporting trigger event indication information; and correspondingly, the transmission module 002 is further specifically configured to: determine, according to the reporting trigger event indication information, whether a reporting trigger event occurs, and when a reporting trigger event occurs, transmit the measurement information on the at least one frequency other than the serving frequency of the second access network node to the second access network node.

Optionally, the reporting trigger event includes at least one of the following events: an event A1, configured to identify that the signal quality of a serving cell is higher than a threshold; an event A2, configured to identify that the signal quality of a serving cell is lower than a threshold; an event A3, configured to identify that the signal quality of a neighboring cell is higher than the signal quality of a first serving cell by a particular value; an event A4, configured to identify that the signal quality of a neighboring cell is higher than a threshold; an event A5, configured to identify that the signal quality of a serving cell is lower than a threshold and the signal quality of a neighboring cell is higher than a threshold; an event A6, configured to identify that the signal quality of a neighboring cell is higher than the signal quality of a second serving cell by a particular value; an event B1, configured to identify that the signal quality of an inter-RAT neighboring cell is higher than a threshold; an event B2, configured to identify that the signal quality of a serving cell is lower than a threshold and the signal quality of an inter-RAT neighboring cell is higher than a threshold.

Optionally, the reporting configuration message is a measurement configuration message transmitted by the second access network node. The measurement configuration message is configured to configure a measurement process by the terminal on the serving frequency of the second access network node. The measurement configuration message is further configured to configure a process of reporting the measurement information on the at least one frequency other than the serving frequency of the second access network node by the terminal.

Further, the transmission module 002 is further specifically configured to transmit a measurement report to the second access network node. The measurement report includes measurement information on the serving frequency of the second access network node and the measurement information on the at least one frequency other than the serving frequency of the second access network node.

Figure 12:
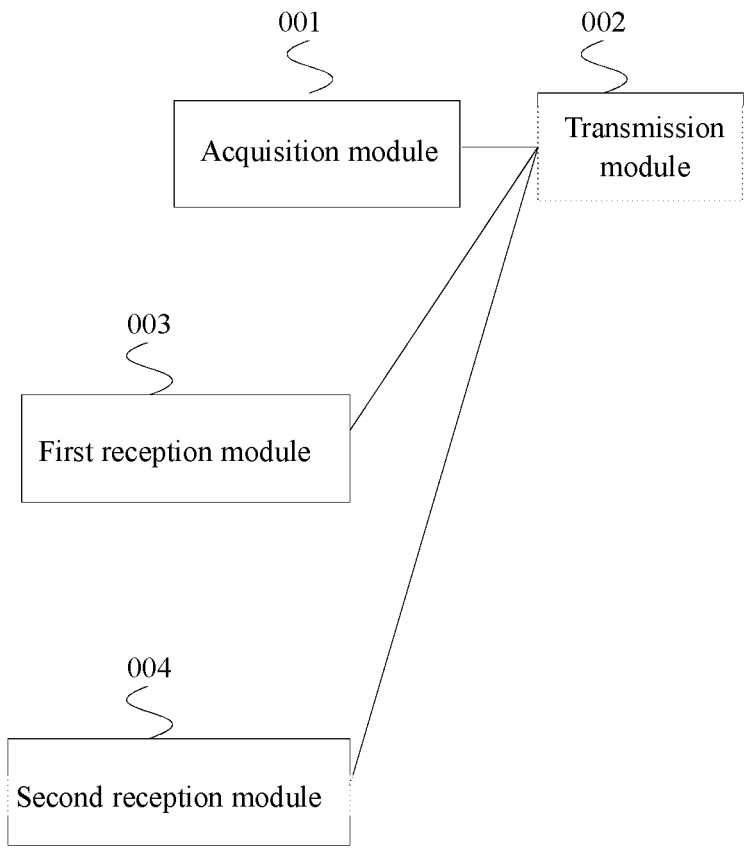
FIG. 12 is a schematic structural diagram of a terminal provided by another embodiment of the present disclosure.

FIG. 12 is a schematic structural diagram of a terminal provided by another embodiment of the present disclosure. As shown in FIG. 12, the terminal further includes a second reception module 004.

The second reception module 004 is configured to receive a reporting request message transmitted by a second access network node. The reporting request message is configured to request the terminal to report measurement information on at least one frequency other than a serving frequency of the second access network node.

Further, the reporting request message includes a first frequency; and correspondingly, the transmission module 002 is further specifically configured to transmit measurement information at a first frequency of a first access network node to the second access network node.

The terminal in this embodiment is configured to implement the foregoing method embodiments, and has similar implementation principles and technical effects. A repeated description is omitted herein.

Figure 13:
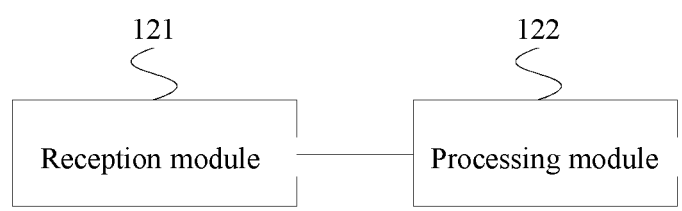
FIG. 13 is a schematic structural diagram of an access network node provided by an embodiment of the present disclosure.

FIG. 13 is a schematic structural diagram of an access network node provided by an embodiment of the present disclosure. The access network node is a second access network node, and the second access network node is an access network node in a multi-connection system. As shown in FIG. 13, the second access network node includes a reception module 121 and a processing module 122.

The reception module 121 is configured to receive measurement information on at least one frequency other than a serving frequency of the second access network node transmitted by a terminal.

The processing module 122 is configured to perform an inter-system processing of the multi-connection system according to the measurement information on the at least one frequency other than the serving frequency of the second access network node.

In this embodiment, after a reception module receives measurement information on at least one frequency other than a serving frequency of the second access network node transmitted by a terminal, a processing module performs an inter-system processing, for example, inter-RAT handover, etc., of a multi-connection system according to the measurement information, thereby solving the problem that the second access network node cannot obtain measurement information on a serving frequency of another access network node and as a result cannot perform a corresponding operation.

Figure 14:
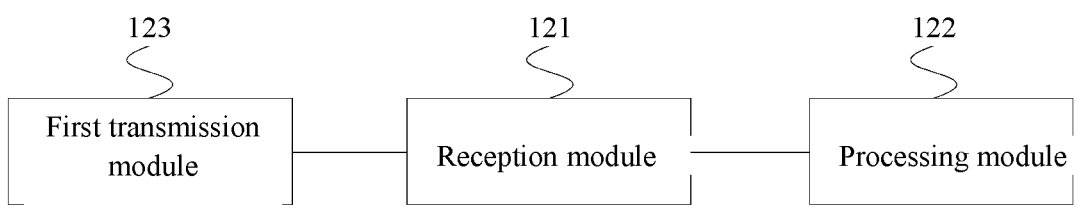
FIG. 14 is a schematic structural diagram of an access network node provided by another embodiment of the present disclosure.

FIG. 14 is a schematic structural diagram of an access network node provided by another embodiment of the present disclosure. As shown in FIG. 14, the access network node further includes a first transmission module 123.

The first transmission module 123 is configured to transmit a reporting configuration message to a terminal. The reporting configuration message includes identification information of a first access network node.

Optionally, the identification information of the first access network node includes an identifier of the first access network node, an identifier of a frequency on which the first access network node operates or an identifier of a cell in which the first access network node operates.

Further, the reporting configuration message includes a first frequency; and correspondingly, the reception module 121 is specifically configured to receive measurement information at the first frequency of the first access network node transmitted by the terminal.

Further, the reporting configuration message includes a reporting period; and correspondingly, the reception module 121 is further specifically configured to receive measurement information on at least one frequency other than a serving frequency of a second access network node periodically reported by the terminal according to the reporting period.

Further, the reporting configuration message includes reporting trigger event indication information; and correspondingly, the reception module 121 is further specifically configured to receive the measurement information on the at least one frequency other than the serving frequency of the second access network node reported by the terminal according to the reporting trigger event indication information.

Optionally, the reporting trigger event includes at least one of the following events: an event A1, configured to identify that the signal quality of a serving cell is higher than a threshold; an event A2, configured to identify that the signal quality of a serving cell is lower than a threshold; an event A3, configured to identify that the signal quality of a neighboring cell is higher than the signal quality of a first serving cell by a particular value; an event A4, configured to identify that the signal quality of a neighboring cell is higher than a threshold; an event A5, configured to identify that the signal quality of a serving cell is lower than a threshold and the signal quality of a neighboring cell is higher than a threshold; an event A6, configured to identify that the signal quality of a neighboring cell is higher than the signal quality of a second serving cell by a particular value; an event B1, configured to identify that the signal quality of an inter-RAT neighboring cell is higher than a threshold; an event B2, configured to identify that the signal quality of a serving cell is lower than a threshold and the signal quality of an inter-RAT neighboring cell is higher than a threshold.

Optionally, the reporting configuration message is a measurement configuration message transmitted by the second access network node. The measurement configuration message is configured to configure a measurement process by the terminal on the serving frequency of the second access network node. The measurement configuration message is further configured to configure a process of reporting the measurement information on the at least one frequency other than the serving frequency of the second access network node by the terminal.

Further, the reception module 121 is further specifically configured to receive a measurement report transmitted by the terminal. The measurement report includes measurement information on the serving frequency of the second access network node and the measurement information on the at least one frequency other than the serving frequency of the second access network node.

Figure 15:
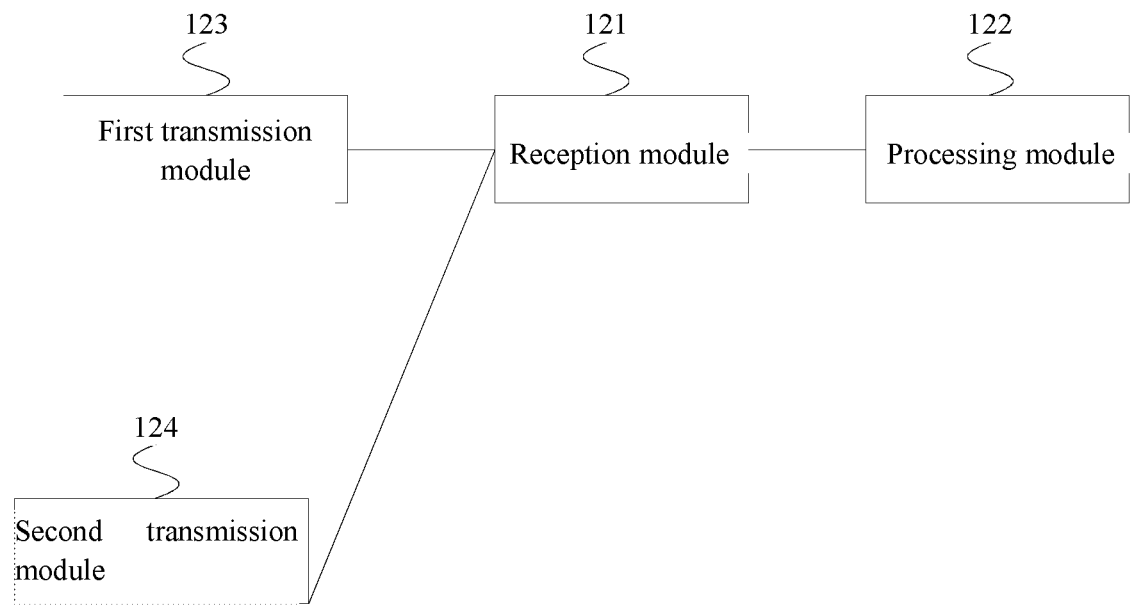
FIG. 15 is a schematic structural diagram of an access network node provided by another embodiment of the present disclosure.

FIG. 15 is a schematic structural diagram of an access network node provided by another embodiment of the present disclosure. As shown in FIG. 15, the access network node further includes a second transmission module 124.

The second transmission module 124 is configured to transmit a reporting request message to a terminal. The reporting request message is configured to request the terminal to report measurement information on at least one frequency other than a serving frequency of a second access network node.

Further, the reporting request message includes a first frequency; and correspondingly, the reception module 121 is further specifically configured to receive measurement information at a first frequency of a first access network node transmitted by the terminal.

The second access network node in this embodiment is configured to implement the foregoing method embodiments, and has similar implementation principles and technical effects. A repeated description is omitted herein.

It is understood, the modular division of the terminal and the second access network node is merely a logical function division, and in actual implementation the modules may be integrated entirely or partly on one physical entity or physically separated. These modules may be entirely implemented in form of software that may be called and executed by a processing element, or entirely implemented in form of hardware, or partly implemented in form of software that may be called and executed by a processing element and partly implemented in form of hardware. For example, the processing module may be a standalone processing element, or integrated in a chip of the device, or may be stored in a storage of the device in form of program code which is configured to be called by a processing element of the device to implement the function of the determination module. Other modules may be implemented in a similar way. In addition, the modules may be entirely or partly integrated together, or implemented separately. Said processing element may be an integrated circuit with signal processing capability. During an implementation process, steps of the methods or the modules may be realized in form of hardware by integrated logical circuits in the processing element, or in form of software by instructions.

For example, these modules may be one or more ICs configured to implement the foregoing methods, e.g., one or more Application Specific Integrated Circuits (ASIC), one or more Digital Signal Processors (DSP), or one or more Field-Programmable Gate Arrays (FPGA), etc. For another example, when a module is implemented in form of program code configured to be called by a processing element, the processing element may be a general purpose processor, e.g., a central processing unit (CPU) or other processor configured to call program code. For another example, these modules may be integrated together in form of a system-on-a-chip (SOC).

Figure 16:
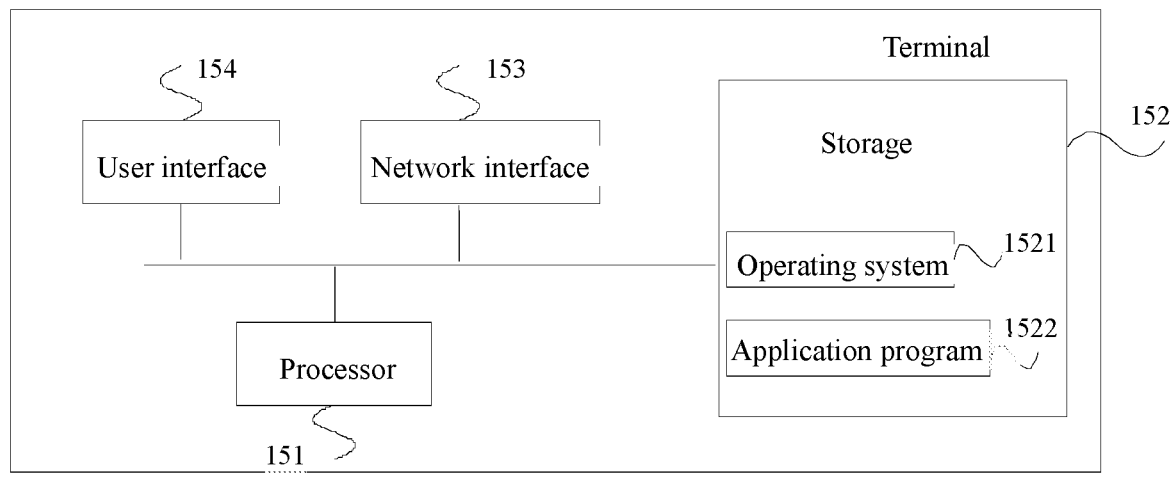
FIG. 16 is a schematic structural diagram of a terminal provided by another embodiment of the present disclosure.

FIG. 16 is a schematic structural diagram of a terminal provided by another embodiment of the present disclosure. As shown in FIG. 16, the terminal includes: a processor 151, a storage 152, a network interface 153, and a user interface 154.

The foregoing components in the terminal are coupled through a bus system 155. It may be understood that the bus system 155 is configured to implement connection and communication between these components. In addition to a data line, the bus system 155 may further include a power bus, a control bus and a status signal bus. However, for clarity, various buses are all labeled as the bus system 155 in FIG. 15.

Alternatively, some or all of the foregoing components may be implemented by being embedded in a chip of the terminal in form of an FPGA. Moreover, these components may be separately implemented or integrated together.

The user interface 154 is configured to be respectively connected to a peripheral or an interface circuit connected to the peripheral, and may include a display, a keyboard or an interface of a device such as a click device, for example, an interface of a device such as a mouse, a trackball, a touch panel or a touch screen.

The processor 151 herein may be a general-purpose processor, for example, a CPU, or may further be one or more integrated circuits configured to implement the foregoing methods, for example, one or more ASICs, or, one or more digital signal processors (DSP), or, one or more FPGAs, and so on. The storage element may be one storage device or may refer to multiple storage elements collectively.

The storage 152 may be a volatile storage or a non-volatile storage or may include both a volatile storage and a non-volatile storage. The non-volatile storage may be a read-only memory (ROM), a programmable ROM (PROM), an erasable RROM (EPROM), an electrically-EPROM (EEPROM) or a flash memory. The volatile storage may be a random access memory (RAM) and is used as an external cache. By way of example and without any limitation, various forms of RAMs are usable, such as a static RAM (SRAM), a dynamic RAM (DRAM), a synchronous DRAM (SDRAM), a double-data-rate SDRAM (DDRSDRAM), an enhanced SDRAM (ESDRAM), a synclink DRAM (SLDRAM), and direct rambus RAM (DRRAM). The storage 152 described in the embodiments of the present disclosure intends to include, without limitation, these and any other suitable types of storages.

Optionally, the storage 152 stores the following elements, executable modules or data structures, or a subset or an extended set thereof: an operating system 1521 and an application program 1522.

The operating system 1521 includes various system programs, for example, framework layer programs, core library layer programs and driver layer programs, and is configured to implement various fundamental services and process hardware-based tasks.

The application program 1522 includes various application programs, for example, a media player, and a browser, and is configured to implement various application services. A program for implementing the methods in the embodiments of the present disclosure may also be included in the application program 1522.

Specifically, the processor 151 calls the program in the storage 152 to implement the methods performed by the modules shown in FIG. 9 to FIG. 11. A repeated description is omitted herein.

Figure 17:
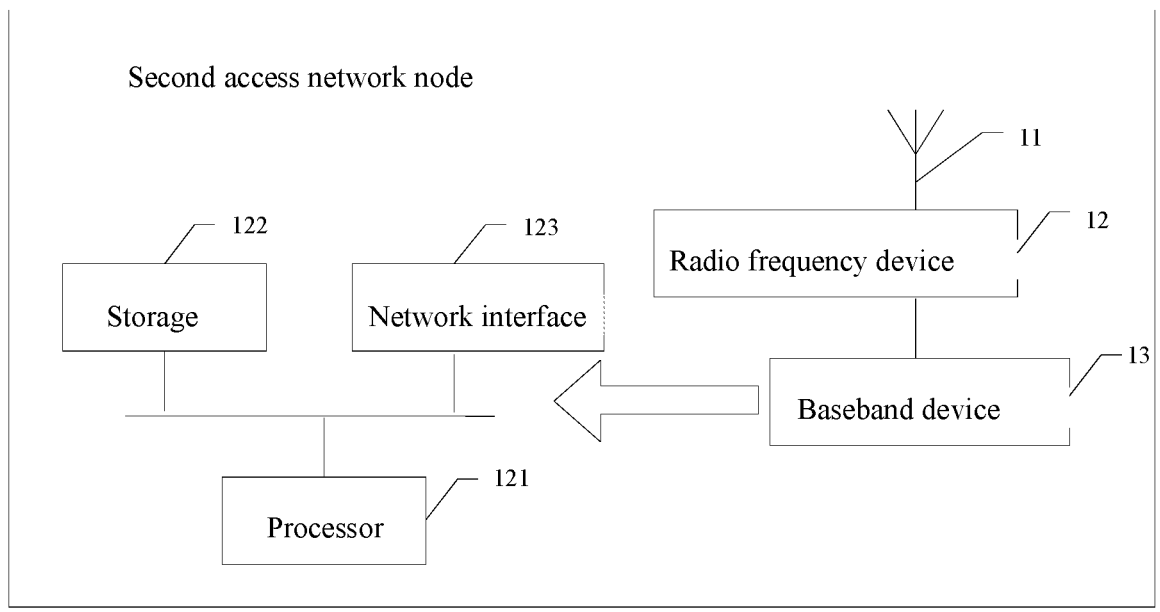
FIG. 17 is a schematic structural diagram of an access network node provided by another embodiment of the present disclosure.

FIG. 17 is a schematic structural diagram of an access network node provided by another embodiment of the present disclosure. The access network node is a second access network node. As shown in FIG. 17, the second access network node includes: an antenna 11, a radio frequency (RF) device 12, and a baseband device 13. The antenna 11 is connected to the RF device 12. In an uplink direction, the RF device 12 receives information through the antenna 11, and transmits the received information to the baseband device 13 for processing. In a downlink direction, the baseband device 13 processes information to be transmitted, and transmits the information to the RF device 12. The RF device 12 processes the received information and transmits the processed information via the antenna 11.

The foregoing frequency band processing device may be located in the baseband device 13. The method performed by the second access network node in the foregoing embodiments may be implemented in the baseband device 13. The baseband device 13 includes a processor 121 and a storage 122.

The baseband device 13 may include, for example, at least one baseband processing board. A plurality of chips are disposed on the baseband processing board. As shown in FIG. 16, one of the chips is, for example, the processor 121, and the processor 121 is connected to the storage 122, to call a program in the storage 122, to perform the operations of the second access network node as described in the foregoing method embodiments.

The baseband device 13 may further include a network interface 123, configured to exchange information with the RF device 12. The interface is, for example, a common public radio interface (CPRI).

The processor herein may be one processor or refer to multiple processing elements collectively. For example, the processor may be a CPU, or may be an ASIC, or one or more ICs configured to implement the method performed by the second access network node, such as one or more DSPs, or one or more FPGAs. The storage element may be one storage or may refer to multiple storage elements collectively.

The storage 122 may be a volatile storage or a non-volatile storage or may include both a volatile storage and a non-volatile storage. The non-volatile storage may be a read-only memory (ROM), a PROM, an EPROM, an EEPROM or a flash memory. The volatile storage may be a random access memory (RAM) and is used as an external cache. By way of example and without any limitation, various forms of RAMs are usable, such as an SRAM, a DRAM, a SDRAM, a DDRSDRAM, an ESDRAM, an SLDRAM, and a DRRAM. The storage 122 described in the embodiments of the present disclosure intends to include, without limitation, these and any other suitable types of storages.

Specifically, the processor 121 calls the program in the storage 122 to implement the methods performed by the modules as shown in FIG. 12 to FIG. 14. A repeated description is omitted herein.

A person of ordinary skill in the art may understand that all or some of the steps in the foregoing method embodiments may be implemented by a hardware in combination with program instructions. The program may be stored in a computer readable storage medium. When the program is executed, the steps in the foregoing method embodiments are performed. The storage medium includes any medium that can store program code, such as a ROM, a RAM, a magnetic disk or an optical disc.

Finally, it should be noted, the foregoing embodiments are only used to illustrate the technical solution of the embodiments of the present disclosure, and by no means constitute any limitation of the present disclosure; although detailed description of the present disclosure is provided with reference to the foregoing embodiments, it should be appreciated that modifications to the technical solution set forth in the embodiments or equivalent replacements of a part or all of the technical features may be made by one of ordinary skill in the art, and these modifications or replacements will not make essences of corresponding technical solutions to depart from the scope of the technical solutions of the embodiments of the present disclosure.

What is claimed is:

1. A non-transitory computer readable storage medium, comprising instructions, wherein the instructions are configured to be executed by a computer, to implement a method of processing measurement information, applied to a multi-connection system comprising at least two access network nodes in communication with a terminal, wherein the method comprises:

receiving, by the terminal, measurement configuration information transmitted by a first access network node;

acquiring, by the terminal, measurement information of at least one frequency other than a serving frequency of a second access network node according to the measurement configuration information; and transmitting, by the terminal, the measurement information of the at least one frequency other than the serving frequency of the second access network node to the second access network node, wherein the at least one frequency other than the serving frequency of the second access network node comprises a serving frequency of the first access network node.

2. The non-transitory computer readable storage medium according to claim 1, wherein, before the transmitting, by the terminal, the measurement information of the at least one frequency other than the serving frequency of the second access network node to the second access network node, the method further comprises:
receiving, by the terminal, a reporting configuration message transmitted by the second access network node, wherein the reporting configuration message comprises identification information of the first access network node; and
correspondingly, the transmitting, by the terminal, the measurement information of the at least one frequency other than the serving frequency of the second access network node to the second access network node comprises:
transmitting, by the terminal, the measurement information of the at least one frequency other than the serving frequency of the second access network node to the second access network node according to the reporting configuration message.

3. The non-transitory computer readable storage medium according to claim 2, wherein the identification information of the first access network node comprises one or more of: an identifier of the first access network node, an identifier of the serving frequency of the first access network node, an identifier of a serving cell of the first access network node, a measurement identifier of the first access network node.

4. The non-transitory computer readable storage medium according to claim 3, wherein the reporting configuration message comprises a first frequency; and
correspondingly, the transmitting, by the terminal, the measurement information of the at least one frequency other than the serving frequency of the second access network node to the second access network node comprises:
transmitting, by the terminal, measurement information of the first frequency of the first access network node to the second access network node;
or,
the reporting configuration message comprises a reporting period; and
correspondingly, the transmitting, by the terminal, the measurement information of the at least one frequency other than the serving frequency of the second access network node to the second access network node is specifically:
periodically transmitting, by the terminal, the measurement information of the at least one frequency other than the serving frequency of the second access network node to the second access network node according to the reporting period;
or,
the reporting configuration message comprises reporting trigger event indication information; and
correspondingly, the transmitting, by the terminal, the measurement information of the at least one frequency other than the serving frequency of the second access network node to the second access network node is specifically:
determining, by the terminal according to the reporting trigger event indication information, whether a reporting trigger event occurs, and when a reporting trigger event occurs, transmitting, by the terminal, the measurement information of the at least one frequency other than the serving frequency of the second access network node to the second access network node.

5. The non-transitory computer readable storage medium according to claim 4, wherein when the reporting configuration message comprises the reporting trigger event indication information, the reporting trigger event comprises at least one of following events:
an event A1, configured to identify that a signal quality of a serving cell is higher than a threshold;
an event A2, configured to identify that a signal quality of a serving cell is lower than a threshold;
an event A3, configured to identify that a signal quality of a neighboring cell is higher than a signal quality of a first serving cell by a particular value;
an event A4, configured to identify that a signal quality of a neighboring cell is higher than a threshold;
an event A5, configured to identify that a signal quality of a serving cell is lower than a threshold and a signal quality of a neighboring cell is higher than a threshold;
an event A6, configured to identify that a signal quality of a neighboring cell is higher than a signal quality of a second serving cell by a particular value;
an event B1, configured to identify that a signal quality of an inter-RAT neighboring cell is higher than a threshold;
an event 132, configured to identify that a signal quality of a serving cell is lower than a threshold and a signal quality of an inter-RAT neighboring cell is higher than a threshold.

6. The non-transitory computer readable storage medium according to claim 2, wherein the reporting configuration message is a measurement configuration message transmitted by the second access network node, the measurement configuration message is configured to configure a measurement process, by the terminal, of the serving frequency of the second access network node, and the measurement configuration message is further configured to configure a process of reporting the measurement information of the at least one frequency other than the serving frequency of the second access network node by the terminal.

7. The non-transitory computer readable storage medium according to claim 1, wherein the transmitting, by the terminal, the measurement information of the at least one frequency other than the serving frequency of the second access network node to the second access network node comprises:
transmitting, by the terminal, a measurement report to the second access network node, wherein the measurement report comprises measurement information of the serving frequency of the second access network node and the measurement information of the at least one frequency other than the serving frequency of the second access network node.

8. The non-transitory computer readable storage medium according to claim 1, wherein, before the transmitting, by the terminal, the measurement information of the at least one frequency other than the serving frequency of the second access network node to the second access network node, the method further comprises:
receiving, by the terminal, a reporting request message transmitted by the second access network node, wherein the reporting request message is configured to request the terminal to report the measurement information of the at least one frequency other than the serving frequency of the second access network node.

9. The non-transitory computer readable storage medium according to claim 1, wherein the first access network node is an access network node in a 5G system, and the second access network node is an access network node in a Long Term Evolution (LTE) system.

10. A non-transitory computer readable storage medium, comprising instructions, wherein the instructions are configured to be executed by a computer, to implement a method of processing measurement information, applied to a multi-connection system comprising at least two access network nodes in communication with a terminal, wherein the method comprises:
  receiving, by a second access network node, measurement information of at least one frequency other than a serving frequency of the second access network node transmitted by the terminal and acquired by the terminal according to measurement configuration information transmitted by a first access network node; and
  performing, by the second access network node, an inter-system processing of the multi-connection system according to the measurement information of the at least one frequency other than the serving frequency of the second access network node.

11. The non-transitory computer readable storage medium according to claim 10, wherein, before the receiving, by the second access network node, the measurement information of the at least one frequency other than the serving frequency of the second access network node transmitted by the terminal, the method further comprises:
  transmitting, by the second access network node, a reporting configuration message to the terminal, Wherein the reporting configuration message comprises identification information of the first access network node.

12. The non-transitory computer readable storage medium according to claim 11, wherein the identification information of the first access network node comprises one or more of: an identifier of the first access network node, an identifier of a serving frequency of the first access network node, an identifier of a serving cell of the first access network node, a measurement identifier of the first access network node.

13. The non-transitory computer readable storage medium according to claim 12, wherein the reporting configuration message comprises a first frequency; and
  correspondingly, the receiving, by the second access network node, the measurement information of the at least one frequency other than the serving frequency of the second access network node transmitted by the terminal comprises:
  receiving, by the second access network node, measurement information of the first frequency of the first access network node transmitted by the terminal;
  or,
  the reporting configuration message comprises a reporting period; and
  correspondingly, the receiving, by the second access network node, the measurement information of the at least one frequency other than the serving frequency of the second access network node transmitted by the terminal is specifically:
  receiving, by the second access network node, the measurement information of the at least one frequency other than the serving frequency of the second access network node periodically reported by the terminal according to the reporting period;
  or,
  the reporting configuration message comprises reporting trigger event indication information; and
  correspondingly, the receiving, by the second access network node, the measurement information of the at least one frequency other than the serving frequency of the second access network node transmitted by the terminal is specifically:
  receiving, by the second access network node, the measurement information of the at least one frequency other than the serving frequency of the second access network node reported by the terminal according to the reporting trigger event indication information.

14. The non-transitory computer readable storage medium according to claim 13, wherein when the reporting configuration message comprises the reporting trigger event indication information, a reporting trigger event comprises at least one of following events:
  an event A1, configured to identify that a signal quality of a serving cell is higher than a threshold;
  an event A2, configured to identify that a signal quality of a serving cell is lower than a threshold;
  an event A3, configured to identify that a signal quality of a neighboring cell is higher than a signal quality of a first serving cell by a particular value;
  an event A4, configured to identify that a signal quality of a neighboring cell is higher than a threshold;
  an event A5, configured to identify that a signal quality of a serving cell is lower than a threshold and a signal quality of a neighboring cell is higher than a threshold;
  an event A6, configured to identify that a signal quality of a neighboring cell is higher than a signal quality of a second serving cell by a particular value;
  an event B1, configured to identify that a signal quality of an inter-RAT neighboring cell is higher than a threshold;
  an event B2, configured to identify that a signal quality of a serving cell is lower than a threshold and a signal quality of an inter-RAT neighboring cell is higher than a threshold.

15. The non-transitory computer readable storage medium according to claim 11, wherein the reporting configuration message is a measurement configuration message transmitted by the second access network node, the measurement configuration message is configured to configure a measurement process, by the terminal, of the serving frequency of the second access network node, and the measurement configuration message is further configured to configure a process of reporting the measurement information of the at least one frequency other than the serving frequency of the second access network node by the terminal.

16. The non-transitory computer readable storage medium according to claim 10, wherein the receiving, by the second access network node, the measurement information of the at least one frequency other than the serving frequency of the second access network node transmitted by the terminal comprises:
  receiving, by the second access network node, a measurement report transmitted by the terminal, wherein the measurement report comprises measurement information of the serving frequency of the second access network node and the measurement in formation of the at least one frequency other than the serving frequency of the second access network node.

17. The non-transitory computer readable storage medium according to claim 10, wherein, before the receiving, by the second access network node, the measurement information of the at least one frequency other than the serving frequency of the second access network node transmitted by the terminal, the method further comprises:

transmitting, by the second access network node, a reporting request message to the terminal, wherein the reporting request message is configured to request the terminal to report the measurement information of the at least one frequency other than the serving frequency of the second access network node.

18. The non-transitory computer readable storage medium according to claim 10, wherein the first access network node is an access network node in a 5G system, and the second access network node is an access network node in a Long Tem Evolution (LTE) system.

* * * * *